UNITED STATES PATENT OFFICE.

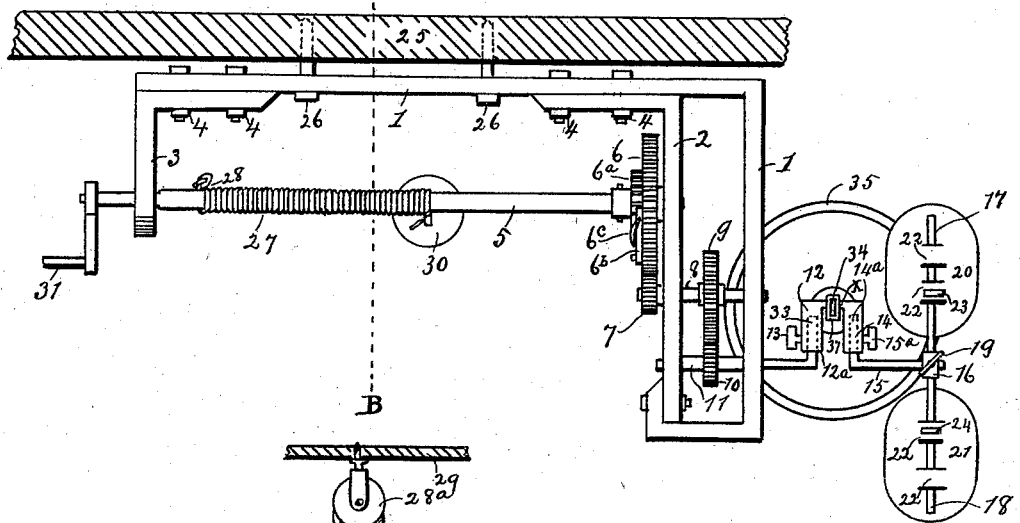

JAMES P. BOLDING, OF FORNEY, TEXAS.

PROPELLER FOR CHURNS.

SPECIFICATION forming part of Letters Patent No. 590,959, dated October 5, 1897.

Application filed May 21, 1897. Serial No. 637,583. (No model.)

*To all whom it may concern:*

Be it known that I, JAMES P. BOLDING, a citizen of the United States, residing at Forney, county of Kaufman, and State of Texas, have invented a new and useful Improvement in Propellers for Churns, &c., which is fully described by the following specification and illustrated by the accompanying drawings, which form a part of this specification.

Figure 1 is a plan view of the device complete. Fig. 2 is a cross-section through Fig. 1, as per dotted line from A to D. Fig. 3 is a side view of the upper end of the dasher-staff with the dasher-staff clevis shown in a cross-section while fitted on the end of the dasher-staff. Fig. 4 is a perspective view of the dasher-staff clevis complete.

Similar numerals of reference refer to similar parts throughout the several views.

The horizontally-disposed frame-pieces 1 2 3, rigidly secured to each other by bolts 4 4 4 4 4, constitute the frame of the device, which is provided with a horizontally-disposed cord-shaft 5, having its bearings on frame-pieces 2 and 3. There is engaged on one end of the cord-shaft a large cog-wheel 6, (provided with a ratchet-wheel $6^a$, made fast to the cord-shaft 5, a ratchet-lever $6^b$, made secure at one end to the cog-wheel 6 and the other end engaging the cogs in the ratchet-wheel, and with a ratchet-spring $6^c$, with one end resting on the ratchet-lever and the other end made fast to the cog-wheel 6,) which engages the small cog-wheel 7, which is secured to the end of shaft 8, having its bearings on frame-pieces 1 and 2, and having rigidly secured thereon a larger cog-wheel 9, which engages a small cog-wheel 10, which is rigidly secured to the shaft 11, having its bearings on frame-pieces 1 and 2. Said shaft extends outwardly from its bearing on frame-piece 1, thence at right angles, so as to be received into the hollow end $12^a$ of the crank-coupling 12, to which it is made secure by a set-screw 15. The crank-coupling is also provided with a hollow end 14, which engages the end $14^a$ of a governor-shaft 15, the two being rigidly secured to each other by set-screw $15^a$. The governor-shaft is provided with a hub 16, to which are secured the ends of the governor-rods 17 and 18, and the whole secured to the governor-shaft by the set-screw 19. The governor-rod is provided with two fans 20 and 21, which are provided with lugs 22, which engage the governor-rods 17 and 18, and made secure thereto by set-screws 23 and 24.

As to the operation of my device, it is rigidly secured to the wall 25 of a house (at a suitable height to admit the churn and dasher-staff underneath it) by screws 26. The cord-shaft is provided with a cord 27, with an end 28 secured to the cord-shaft, and extends upwardly from the cord-shaft, passing over a pulley $28^a$, (which is made fast to the ceiling 29,) thence downwardly, where it is tied to a weight 30. The device is wound up by turning the crank 31, which winds the cord around the cord-shaft, as shown in Fig. 1, at the same time raising the weight to its highest point immediately underneath the pulley. When wound up, the weight immediately starts downwardly to the floor 32, (its lowest point of descent,) propelling the entire system of cog-wheels and the shafts which carry them. Thus it will be seen that rotary motion is given to shaft 11, to which is secured at its end 33 crank-coupling 12, the two parts 33 and 12 forming a crank which gives motion to the dasher-shaft 34, which is engaged in the churn 35.

The dasher-shaft is attached to the crank-coupling by placing that part of the crank-coupling marked X into one of the apertures 36 made in the upper end of the dash-shaft, then slipping the dasher-shaft clevis 37 over the end of the dasher-rod, so that the lip 38 will come immediately over the aperture engaging that part of the crank-coupling marked X.

The governor formed by the parts 16, 17, 18, and 19, secured to part 15, accomplishes the purposes of regulating the motion of the device by turning the broad surfaces of the fans to the surrounding air or turning them on the rods 17 and 18, so that the resistance to the air can be lessened, then again for the purpose of keeping the flies away from the churn while the device is in motion.

The dasher-shaft being perfectly rigid, the motion of the dasher-shaft created by the crank (which propels it) is oblique instead of vertical, so that the dasher attached in the ordinary way to the dasher-shaft does not come in contact with the milk squarely, but the dasher comes in contact with the milk inclined to one side, so as to give a rotary motion to the milk in the churn. In winding up the device by the use of the crank 31 the cord-shaft and the ratchet-wheel only are put in motion, the balance of the device remaining motionless during the operation of winding.

Having described all that is necessary for a clear understanding of my device, what I claim, and desire to secure by Letters Patent of the United States, is—

The combination with the frame having the pieces 1, 2, 3, of a cord-shaft journaled in the pieces 2, 3, a weight 30 attached to said shaft by a cord 27, a cog-wheel 6 mounted on said shaft, a ratchet-wheel $6^a$ secured on said shaft, a ratchet-lever $6^b$ pivoted on the cog-wheel and engaging the ratchet-wheel, a spring $6^c$ secured on the cog-wheel and bearing on the ratchet-lever, shafts 8 and 11 journaled in the frame-pieces 1, 2, intermeshing cog-wheels 9, 10 on said shafts, a cog-wheel 7 on the shaft 8 meshing with the cog-wheel 6, crank-coupling 12 attached to the shaft 11, a governor-shaft 15 attached to said coupling, rods 17, 18 secured to the end of the governor-shaft, and fans 20, 21 carried by said rods.

JAMES P. BOLDING.

Witnesses:
O. L. CASH,
J. D. FITE.